United States Patent [19]
Von Der Eltz et al.

[11] Patent Number: 5,851,239
[45] Date of Patent: Dec. 22, 1998

[54] SPIN DYEING PROCESS WITH DYEING SALTS

[75] Inventors: Andreas Von Der Eltz, Frankfurt am Main; Andreas Schrell, Kriftel, both of Germany

[73] Assignee: Dystar Textilfarben GmbH & Co., Germany

[21] Appl. No.: 952,769

[22] PCT Filed: May 15, 1996

[86] PCT No.: PCT/EP96/02082

§ 371 Date: Nov. 21, 1997

§ 102(e) Date: Nov. 21, 1997

[87] PCT Pub. No.: WO96/37643

PCT Pub. Date: Nov. 28, 1996

[30] Foreign Application Priority Data

May 24, 1995 [DE] Germany ............... 195 19 024.6

[51] Int. Cl.$^6$ ............... D06F 2/16; C08L 1/24; D06P 1/50; D06P 3/66
[52] U.S. Cl. ............... 8/538; 8/554; 8/561; 8/562; 8/921; 8/543
[58] Field of Search ............... 8/538, 543, 554, 8/561, 562, 921

[56] References Cited

U.S. PATENT DOCUMENTS

| | | | |
|---|---|---|---|
| 3,066,032 | 11/1962 | Fukushima | 106/165 |
| 3,163,550 | 12/1964 | Webb et al. | |
| 3,304,297 | 2/1967 | Wegmann et al. | 8/647 X |
| 4,767,807 | 8/1988 | Fujikawa et al. | |

FOREIGN PATENT DOCUMENTS

| | | |
|---|---|---|
| 0665311 | 8/1995 | European Pat. Off. |
| 1238612 | 4/1967 | Germany |
| 3628244 | 2/1987 | Germany |

OTHER PUBLICATIONS

Andrew Streitwieser, Jr. et al, Introduction to Organic Chemistry, 2$^{nd}$ Edition, (1981), p. 267.

Hashimoto, T. et al, *Chem. Abs.* 86:44681c of JP 76121062, Oct., 1976.

*Primary Examiner*—Margaret Einsmann
*Attorney, Agent, or Firm*—Connolly & Hutz

[57] ABSTRACT

Process for preparing colored regenerated-cellulose fiber, which comprises adding a formulation comprising a cationized polysaccharide and an anionic dye to a viscose dope, an alkali cellulose or a cellulose solution and spinning fiber by a viscose spinning process or from the cellulose solution.

12 Claims, No Drawings

SPIN DYEING PROCESS WITH DYEING SALTS

Regenerated cellulose is customarily colored by printing, exhaust-dyeing or pad-dyeing with direct, reactive, vat or sulfur dyes. These processes are carried out on yarn or fabric. If colored yarn is to be produced by spinning alone, it has hitherto been necessary to use pigments, which are customarily added to the spinning solution (Chemiefasern-Textilindustrie, Volume 34/86 (1984) No. 6, 444). One difficulty with this is to achieve homogeneous dispersion of the pigments in order that uniformly colored yarns may be obtained and the entrainment of pigments into the coagulation bath may be prevented. A further defect of spin-dyeing with pigments is the brilliance of the colors, which does not reach the brilliance of conventional dyeings with textile dyes because of the encapsulation of the particles in the cellulose substrate. It is true that the simple addition of a textile dye to the spinning solution leads to the dye being encapsulated in the course of coagulation, but this dye can be washed out again, depending on size and affinity. In addition, the coagulation bath becomes contaminated with dye, so that costly wash processes would become necessary.

It is an object of the present invention to provide a way of obtaining colored regenerated-cellulose yarns without the aforementioned disadvantages of the textiles produced therefrom.

It has been found that, surprisingly, a formulation comprising cationized polysaccharides and anionic dyes can be used in the spin-dyeing of viscose and that the colored yarns and textiles produced therefrom overcome the above-described disadvantages of the prior art.

The present invention accordingly provides a process for preparing colored regenerated-cellulose fiber, which comprises adding a formulation comprising a cationized polysaccharide and an anionic dye to a viscose dope, an alkali cellulose or a cellulose solution and spinning fiber by a viscose spinning process or from the cellulose solution. The cationized polysaccharide forms a mixture or a salt with the anionic dye in the formulation.

Suitable dyesalts or mixtures are preferably those comprising cationized starch or cationized cellulose and a reactive dye, an acid dye or a direct dye containing one or more, preferably 1 to 6, anionic groups, such as the carboxylate group and/or sulfonate group, in the molecule.

Cationized starches having a degree of substitution of about 0.05 are known (for example Houben-Weyl, 1987, vol. E20, part 3, pages 2135–2151) and in some instances commercially available, but it is also possible to use cationized starches having a degree of substitution of greater than 0.1 up to a maximum value of 3. A degree of substitution of 3 means that every one of the three free OH groups in every glucose unit has been reacted with a cationic radical. A degree of substitution of, for example, 0.01 means that, on average, every hundredth glucose unit has a cationized OH group. Cationic radicals preferably include $C_1$–$C_4$-alkylammonium radicals which have been etherified with an OH group of the polysaccharide, especially radicals of the formula —$(CHR^1)_x$—$N'R^2R^3R^4$, where $R^1$ is hydrogen, hydroxyl, amino, ammonium, $C_1$–$C_4$-alkyl or $C_1$–$C_4$-alkoxy; $R^2$, $R^3$ and $R^4$ are identical or different and each is independently of the others hydrogen, phenyl or $C_1$–$C_4$-alkyl which may be substituted by one or more OH groups or $OCH_3$ groups or interrupted by oxygen atoms or NH groups, or the radicals $R^2$, $R^3$ and $R^4$ form together with the nitrogen atom a 5- to 7-membered heterocyclic ring which optionally contains further of the heteroatoms N, S and O in the ring, for example pyridinium, and x is a number from 1 to 4, preferably 2 to 3.

Particular preference is given to cationic radicals of the formula —$CH_2CH_2NH_3^+$, —$CH_2CH_2CH_2NH_3^+$, —$CH_2CH_2N(CH_3)_3^+$ and —$CH_2CHOHCH_2N(CH_3)_3^+$.

The degree of polymerization of the cationized polysaccharides used is advantageously between 100 and 1000, preferably 100 and 600, anhydroglucose units.

The cationic polysaccharides with a low degree of substitution (less than 0.1) are prepared by or analogously to known methods, for example as described in Houben-Weyl, 1987, vol. E 20, part 3, pages 2135–2151. More highly substituted cationized polysaccharides (degree of substitution 0.1 and greater) are prepared by reacting the polysaccharide, for example any starch, such as potato starch, maize starch or wheat starch or a cellulose such as cotton, vegetable fibers, for example linen, hemp, jute and ramie fibers, or staple viscose at a pH of 9 to 14, preferably 9.5 to 13, and advantageously at a temperature of between 40 and 100EC with a $C_1$–$C_4$-alkylammonium compound which has a substituent reactive toward OH groups, for example "-chloro-$-hydroxy, 1,2-epoxy, sulfatoethyl or 1-(sulfatoethyl sulfone) substitution.

Examples of $C_1$–$C_4$-alkylammonium compounds which are used for cationizing said polysaccharides are glycidyltrimethylammonium sulfate or chloride, sulfatoethyltrimethylammonium sulfate or chloride and also 3-chloro-2-hydroxypropyltrimethylammonium sulfate or chloride.

Anionic dyes which form dyesalts or mixtures with the cationic polysaccharides described have been extensively described in the literature. They can belong to the very wide range of dye classes, for example to the class of the monoazo, disazo, polyazo, metal complex azo, such as 1:1 copper, 1:2 chromium and 1:2 cobalt complex monoazo and disazo dyes, also from the series of the anthraquinone dyes, copper, nickel and cobalt phthalocyanine dyes, copper formazan dyes, azomethine, nitroaryl, dioxazine, triphendioxazine, phenazine and stilbene dyes.

Fiber-reactive radicals are for example: vinylsulfonyl, $-chloroethylsulfonyl, $-sulfatoethylsulfonyl, $-acetoxyethylsulfonyl, $-phosphatoethylsulfonyl, $-thiosulfatoethylsulfonyl, N-methyl-N-($-sulfatoethylsulfonyl)amino, acryloyl, —CO—CCl=$CH_2$, —CO—CH=CH—Cl, —CO—CCl=CHCl, —CO—CCl=CH—$CH_3$, —CO—CBr=$CH_2$, —CO—CH=CH—Br, —CO—CBr=CH—$CH_3$, —CO—CCl=CH—COOH, —CO—CH=CCl—COOH, —CO—CBr=CH—COOH, —CO—CH=CBr—COOH, —CO—CCl=CCl—COOH, —CO—CBr=CBr—COOH, $-chloro— or $-bromopropionyl, 3-phenylsulfonylpropionyl, 3-methylsulfonylpropionyl, 3-chloro-3-phenylsulfonylpropionyl, 2,3-dichloropropionyl, 2,3-dibromopropionyl, 2-fluoro-2-chloro-3,3-difluorocyclobutane-2-carbonyl, 2,2,3,3-tetrafluorocyclobutane-1-carbonyl or -1-sulfonyl, $-(2,2,3,3-tetrafluorocyclobut-1-yl)acryloyl, "— or $-methylsulfonylacryloyl, propiolyl, chloroacetyl, bromoacetyl, 4-($-chloroethylsulfonyl)butyryl, 4-vinylsulfonylbutyryl, 5-($-chloroethylsulfonyl)valeryl, 5-vinylsulfonylvaleryl, 6-($-chloroethylsulfonyl)caproyl, 6-vinylsulfonylcaproyl, 4-fluoro-3-nitrobenzoyl, 4-fluoro-3-nitrophenylsulfonyl, 4-fluoro-3-methylsulfonylbenzoyl, 4-fluoro-3-cyanobenzoyl, 2-fluoro-5-methylsulfonylbenzoyl, 2,4-dichlorotriazin-6-yl, 2,4-dichloropyrimidin-6-yl, 2,4,5-trichloropyrimidin-6-yl, 2,4-dichloro-5-nitro- or -5-methyl- or -5-carboxymethyl- or -5-carboxy- or -5-cyano- or -5-vinyl- or -5-sulfo- or -5-mono-, -di- or -trichloromethyl- or -5-methylsulfonyl-pyrimidin-6-yl, 2,5-dichloro-4-methylsulfonylpyrimidin-6-yl, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulfonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulfonyl-4-pyrimidinyl, 2-fluoro-5-sulfonamido-4-pyrimidinyl, 2-fluoro-5-chloro-6-carbomethoxy-4-pyrimidinyl, 2,6-difluoro-5-trifluoromethyl-4-pyrimidinyl, 2,4-bis(methylsulfonyl)pyrimidin-4-yl, 2,5-bis(methylsulfonyl)-5-chloropyrimidin-4-yl, 2-methylsulfonylpyrimidin-4-yl, 2-phenylsulfonylpyrimidin-4-yl, 2-methylsulfonyl-5-chloro-6-methylpyrimidin-4-yl, 2-methylsulfonyl-5-bromo-6-methylpyrimidin-4-yl, 2-methylsulfonyl-5-chloro-6-ethylpyrimidin-4-yl, 2-methylsulfonyl-5-chloromethylpyrimidin-4-yl, 2-methylsulfonyl-5-nitromethylpyrimidin-4-yl, 2,5,6-trismethylsulfonylpyrimidin-4-yl, 2-methylsulfonyl-5,6-dimethylpyrimidin-4-yl, 2-ethylsulfonyl-5-chloro-6-methylpyrimidin-4-yl, 2-methylsulfonyl-6-chloropyrimidin-4-yl, 2,6-bis(methylsulfonyl)-5-chloropyrimidin-4-yl, 2-methylsulfonyl-6-carboxypyrimidin-4-yl, 2-methylsulfonyl-5-sulfopyrimidin-4-yl, 2-methylsulfonyl-6-carbomethoxypyrimidin-4-yl, 2-methylsulfonyl-5-carboxypyrimidin-4-yl, 2-methylsulfonyl-5-cyano-6-methoxypyrimidin-4-yl, 2-methylsulfonyl-5-chloropyrimidin-4-yl, 2-sulfoethylsulfonyl-6-methylpyrimidin-4-yl, 2-methylsulfonyl-5-bromo-pyrimidindin-4-yl, 2-phenylsulfonyl-5-chloropyrimidin-4-yl, 2-carboxymethylsulfonyl-5-chloro-6-methylpyrimidin-4-yl, 2,4-dichloropyrimidine-6-carbonyl or -6-sulfonyl, 2,4-dichloropyrimidine-5-carbonyl or -5-sulfonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulfonyl, 2,4-dichloro-6-methylpyrimidine-5-carbonyl or -5-sulfonyl, 2-methylsulfonyl-6-chloropyrimidin-4-yl and -5-carbonyl, 2,6-bis(methylsulfonyl)pyrimidin-4-or -5-carbonyl, 2-ethylsulfonyl-6-chloropyrimidine-5-carbonyl, 2,4-bis(methylsulfonyl)pyrimidine-5-sulfonyl, 2-methylsulfonyl-4-chloro-6-methylpyrimidine-5-sulfonyl or -5-carbonyl, 2-chloroquinoxaline-3-carbonyl, 2- or 3-monochloroquinoxaline-6-carbonyl, 2- or 3-monochloroquinoxaline-6-sulfonyl, 2,3-dichloroquinoxaline-5- or -6-carbonyl, 2,3-dichloroquinoxaline-5- or -6-sulfonyl, 1,4-dichlorophthalazine-6-sulfonyl or -6-carbonyl, 2,4-dichloroquinazoline-7- or -6-sulfonyl or -carbonyl, 2,4,6-trichloroquinazoline-7- or -8-sulfonyl, 2- or 3- or 4-(4',5'-dichloropyridaz-6'-on-1'-yl)phenylsulfonyl or -carbonyl, $-(4',5'-dichloropyridaz-6'-on-1'-yl)propionyl, 3,6-dichloropyridazine-4-carbonyl or -4-sulfonyl, 2-chlorobenzothiazole-5- or -6-carbonyl or -5- or -6-sulfonyl, 2-arylsulfonyl- or 2-alkylsulfonylbenzothiazole-5- or -6-carbonyl or -5- or -6-sulfonyl, such as 2-methylsulfonyl or 2-ethylsulfonylbenzothiazole-5- or -6-sulfonyl or -carbonyl, 2-phenylsulfonylbenzothiazole-5- or -6-sulfonyl or -carbonyl and the corresponding 2-sulfonylbenzothiazole-5- or -6-carbonyl- or -sulfonyl derivatives with sulfo groups in the fused-on benzene ring, 2-chlorobenzoxazole-5- or -6-carbonyl or -sulfonyl, 2-chlorobenzimidazole-5- or -6-carbonyl or -sulfonyl, 2-chloro-1-methylbenzimidazole-5- or -6-carbonyl or -sulfonyl, 2-chloro-4-methylthiazole(1, 3)-5-carbonyl or -4- or -5-sulfonyl, ammonium-containing triazine rings, such as 2-trimethylammonium-4-phenylamino- and -4-(o, m- or p-sulfophenyl)amino-6-triazinyl, 2-(1,1-dimethylhydrazinium)-4-phenylamino- and -4-(o-, m- or p-sulfophenyl)amino-6-triazinyl, 2-(2-isopropylidene-1,1-dimethyl)hydrazinium-4-phenylamino- and -4-(o-, m- or p-sulfophenyl)amino-6-triazinyl, 2-N-aminopyrrolidinium-, 2-N-aminopiperidinium-4-phenylamino- or -4-(o-, m- or p-sulfophenyl)amino-6-triazinyl, 4-phenylamino- or 4-(sulfophenylamino)-6-triazinyl which contains 1,4-bisazabicyclo[2.2.2] octane or 1,2-bisazabicyclo[0.3.3]-octane bonded in quaternary fashion in the 2-position via a nitrogen bond, 2-pyridinium-4-phenylamino- or -4-(o-, m- or p-sulfophenyl) amino-6-triazinyl and corresponding 2-onium-6-triazinyl radicals which are substituted in the 4-position by alkylamino, such as methylamino, ethylamino or β-hydroxyethylamino, or alkoxy, such as methoxy or ethoxy, or aryloxy, such as phenoxy or sulfophenoxy.

It is possible for one or more, preferably 1 or 2, reactive hooks of the dye to be reacted with one or more free OH groups of the cationic polysaccharide, especially the 6-OH group, in the manner known for reactive dyes, for example by setting an alkaline pH and/or heating to 40° to 80° C.

Suitable acid and direct dyes include: diamine dyes, ®Sirius Light Fast dyes, ®Alphanol dyes, ®Cotonerol dyes and ®Duasyn dyes, such as, for example, C.I. Acid Black 27 (C.I. No. 26 310), C.I. Acid Black 35 (C.I. No. 26 320), C.I. Acid Blue 113 (C.I. No. 26 360), C.I. Direct Orange 49 (C.I. No. 29 050), C.I. Direct Orange 69 (C.I. No. 29 055), C.I. Direct Yellow 34 (C.I. No. 29 060), C.I. Direct Red 79 (C.I. No. 29 065), C.I. Direct Yellow 67 (C.I. No. 29 080), C.I. Direct Brown 126 (C.I. No. 29085), C.I. Direct Red 84 (C.I. No. 35 760), C.I. Direct Red 80 (C.I. No. 35 780), C.I. Direct Red 194 (C.I. No. 35 785), C.I. Direct Red 81 (C.I. No. 28 160), C.I. Direct Red 32 (C.I. No. 35 790), C.I. Direct Blue 162 (C.I. No. 35 770), C.I. Direct Blue 159 (C.I. No. 35 775), C.I. Direct Black 162:1 and C.I. Direct Violet 9 (C.I. No. 27 885).

The formulations used in this invention are prepared by reacting the cationized polysaccharide with the desired anionic dye in a weight ratio of 1:1 to 1:100, preferably 1:3 to 1:6 in the case of a polysaccharide having a low degree of substitution and 1:20 to 1:100 in the case of a polysaccharide having a higher degree of substitution, and at a pH of 5 to 9, preferably 6 to 8, in aqueous or aqueous-organic solution and preferably precipitating the product by addition of an alcohol, or evaporating or spray-drying the solution, or by intensively mixing the pulverulent solids with one another. In some cases the precipitate forms spontaneously after the reaction.

The formulations used in this invention have deep colors and can be mixed with pulp or colorless celluloses in various concentrations in the course of the viscosemaking process. The dye is bound so strongly to the polysaccharide and thus to the viscose that the coagulation bath does not become contaminated. This even applies to dyes which are not additionally bonded covalently to the polysaccharide via a reactive hook. In this way it is possible to produce colored spinning solutions which can be coagulated to form colored regenerated fiber or film. The starch or cellulose radicals of the dyesalts become presumably embedded in the viscose matrix and prevent any leaching out of the dyes.

It is known, for example from G. Ebner, D. Scholz, Textilfärberei und Farbstoffe, Springer Verlag 1989, page 50, how celluloses, chiefly in the form of pulp, are processed by the xanthate process into viscoses. Apart from the xanthate process there are further processes for dissolving and spinning pulps and linters such as, for example, the nitrate process, the acetate process, the copper process (cuprammonium rayon, Bemberg silk) and the N-methylmorpholine N-oxide process (®Tencel). Cellulose can also be dissolved with LiOH/dimethylformamide. The pulp used comes predominantly from wood products and has a lower degree of polymerization than cotton. Linters are short cotton fibers and a costly viscosemaking raw material, which is usually only used in the cuprammonium process which is used for producing hollow membranes for dialysis.

The process for producing the colored regenerated-cellulose fiber is carried out either by subjecting cellulose to alkaline digestion (alkali cellulose), by reaction with carbon disulfide and adding said dyesalts to the resulting viscose spinning solution, or by adding the dyesalts directly to the alkali cellulose and then xanthating. Subsequent spinning into an acidic spin bath produces colored viscose fiber.

The dyesalts and mixtures used for the present process are incorporated into the viscose spinning dope in an aqueous medium or else advantageously by means of emulsifiers and are highly compatible with the viscose. The dyesalt is added in an amount of 1 to 20%, preferably 1 to 12% by weight, based on the cellulose content of the spinning dope prior to precipitation and shaping.

If the fiber of the present invention is produced by other customary processes for producing cellulosic fiber from solution which are known to the person skilled in the art, for example the cupro process, the lyocell process and the process involving low-substituted cellulose ethers, then the cellulose is dissolved in a suitable organic solvent, admixed with the dyesalt and spun into fiber directly from the solution. It is best to effect the addition directly prior to the spinning, in which case the mixing and homogeneous dispersion can be effected using known mixing systems involving static or dynamic mixing systems. However, the addition can also take place in any desired earlier stage of producing the spinning dope.

The alkalicellulose is preferably produced using 15 to 20% strength by weight aqueous alkali metal hydroxide solution, for example aqueous sodium hydroxide or potassium hydroxide solution, preferably aqueous sodium hydroxide solution, at a temperature of 20° to 40° C. Advantageously 1000 to 3000% by weight of parts of aqueous alkali metal hydroxide solution are used per 100 parts by weight of fiber.

The present invention also provides colored regenerated-cellulose fiber produced by the above-described processes and process variants. The colored regenerated-cellulose fiber can be processed into wovens and knits by customary methods. Owing to the strong bond between the dyesalts and the cellulose fiber, textiles produced therefrom have high fastness properties, especially wash, perspiration and rub fastness properties. There is therefore no need for a separate dyeing process.

In the examples which follow, parts are by weight. The molar masses of the starches used are customarily based on one anhydroglucose unit.

EXAMPLE 1 a) 20 parts of a commercial cationized starch, for example ®Catsol, ®Fibraffin or ®Cerestar, with an average degree of substitution of about 0.05 and an average molecular weight of 198 are stirred into 300 ml of water together with 93 parts (0.1 mol) of C.I. Reactive Red 239 (CAS 89157-03-9). The pH of the solution is 6. After stirring at 25° C. for 30 min, the mixture is evaporated. The result obtained is a deep red dyesalt. The isolated, colored product can then be used for spin-dyeing.

b) 60 parts of pulp are admixed with 1000 parts of 18% strength aqueous sodium hydroxide solution and agitated for 45 minutes. Thereafter the excess lye is sucked off through a glass frit. The alkalicellulose thus produced is ripened at 60° C. for 60 minutes, cooled down to 15° C. and admixed with 20 parts of carbon disulfide in such a way that the temperature does not exceed 30° C. After 45 minutes' reaction time, the yellowish mass is added to 450 parts of 4% strength aqueous sodium hydroxide solution, and the xanthate is stirred to form a homogeneous, viscous dope. After devolatilization the spinning dope is admixed with 6 parts of dyesalt of a), dispersed in 15 parts of water, followed by homogenization in the viscose. The colored viscose is then spun by plant-customary viscose spinning processes into a bath comprising sulfuric acid, sodium sulfate and zinc sulfate to form fiber, which is stretched in acidic baths, cut, washed, spin finished and dried.

EXAMPLE 2 a) 20 parts of the commercial cationized starch ®Catsol having an average degree of substitution of 0.05 and an average molecular weight of 198 are stirred into 300 ml of water together with 70 parts (0.1 mol) of C.I. Reactive Blue 19. The pH of the solution is adjusted to 10 with sodium carbonate. After stirring at 60° C. for 30 min the mixture is evaporated. The result obtained is a deep blue dyesalt. The isolated, colored product can then be used for spin-dyeing.

b) 60 parts of pulp are admixed with 1000 parts of 18% strength aqueous sodium hydroxide solution and agitated for 45 minutes. Thereafter the excess lye is sucked off through a glass frit. The alkalicellulose thus produced is ripened at 60° C. for 60 minutes, cooled down to 15° C. and admixed with 20 parts of carbon disulfide in such a way that the temperature does not exceed 30° C. After 45 minutes' reaction time, the yellowish mass is added to 450 parts of 4% strength aqueous sodium hydroxide solution, and the xanthate is stirred to form a homogeneous, viscous dope.

After devolatilization the spinning dope is admixed with 6 parts of dyesalt of a), dispersed in 15 parts of water, followed by homogenization in the viscose. The colored viscose is then spun by plant-customary viscose spinning processes into a bath comprising sulfuric acid, sodium sulfate and zinc sulfate to form fiber, which is stretched in acidic baths, cut, washed, spin finished and dried.

EXAMPLE 3

20 parts of the commercial cationized starch ®Fibraffin having an average degree of substitution of 0.05 and an average molecular weight of 198 are stirred into 300 ml of water together with 70 parts (0.1 mol) of the turquoise reactive dye known from Example 2 of DE-A-1 179 317. The pH of the solution is adjusted to 10 with sodium carbonate. After stirring at 60° C. for 30 min the mixture is evaporated.

The result obtained is a turquoise solid. The isolated, colored product can then be used for spin-dyeing. A colored viscose fiber is prepared as described in Examples 1b.) and 2.b).

EXAMPLE 4

Preparation of the Starch Ether 162 g (1 mol) of potato starch, technically dry, are added in a kneader to 500 ml of water in which 26.4 g (0.66 mol) of sodium hydroxide have been dissolved beforehand. Then 130 g (0.6 mol) of 2,3-epoxypropyl-trimethylammonium chloride are added as 70% strength solution in water. The mixture is kneaded at 60° C. for 4 hours, cooled down to room temperature and adjusted to pH 6 with sulfuric acid. The viscosity is 5.6 Pas at 50° C. and 19.6 Pas at 20° C.

1 part of the above-described cationized starch having an average degree of substitution of 0.67 is ground together with 93 parts of C.I. Reactive Red 239 (CAS 89157-03-9). A colored viscose fiber is produced as described in Examples 1b) and 2b).

In addition, the following dyes are used and reacted with a cationic starch according to Example 1:

| Example | | Color |
|---|---|---|
| 5 | C.I. Reactive Red 21 (CAS 85940-66-5) | red |
| 6 | C.I. Reactive Red 35 (CAS 85940-67-6) | red |
| 7 | C.I. Reactive Red 174 (CAS 68833-98-7) | red |
| 8 | EP-A-0 457 715 Ex. 106 | red |
| 9 | EP-A-0 122 881 Ex. 1 | red |
| 10 | C.I. Reactive Orange 91 | orange |
| 11 | C.I. Reactive Yellow 23 (CAS 72187-36-1) | yellow |
| 12 | EP-A-0 158 233 Ex. 1 | yellow |
| 13 | DE-A-2 840 380 Ex. 1 | yellow |
| 14 | C.I. Reactive Blue 182 (EP 0 228 348 11) | blue |
| 15 | C.I. Reactive Black 5 | bluish black |
| 16 | EP-A-0 153 599 Ex. 1 | blue |
| 17 | C.I. Direct Orange 49 (C.I. No. 29 050) | orange |
| 18 | C.I. Acid Blue 113 (C.I. No. 26 360) | blue |

What is claimed is:

1. A process for preparing colored regenerated-cellulose fiber, which comprises adding a drysalt formulation comprising a cationized polysaccharide and an anionic dye to a viscose dope, an alkali cellulose or a cellulose solution and spinning fiber by a viscose spinning process or from the cellulose solution.

2. The process of claim 1, wherein the formulation consists essentially of a cationic starch or cationic cellulose and a reactive dye, an acid dye or a direct dye containing at least one anionic group.

3. The process of claim 1, wherein the cationic radical of the cationic polysaccharide is a $C_1$–$C_4$-alkylammonium group which is etherified with a hydroxyl group of the polysaccharide.

4. The process of claim 1, wherein the cationic radical of the cationic polysaccharide is a radical of the formula —$(CHR^1)_x$—$^{\oplus}NR^2R^3R^4$, where $R^1$ is hydrogen, hydroxyl, amino, ammonium, $C_1$–$C_4$-alkyl or $C_1$–$C_4$-alkoxy;

$R^2$, $R^3$ and $R^4$ are identical or different and each is independently of the others hydrogen, phenyl or $C_1$–$C_4$-alkyl which is unsubstituted or substituted by one or more OH groups or $OCH_3$ groups or interrupted by oxygen atoms or NH groups, or the radicals $R^2$, $R^3$ and $R^4$ form together with the nitrogen atom a 5- to 7-membered heterocyclic ring which optionally contains at least one further heteroatom N, S or O in the ring and x is a number from 1 to 4.

5. The process of claim 1, wherein the cationic radical of the cationic polysaccharide is a radical of the formula —$CH_2CH_2NH_3^+$, —$CH_2CH_2CH_2NH_3^+$, —$CH_2CH_2N(CH_3)_3^+$ or —$CH_2CHOHCH_2N(CH_3)_3^+$.

6. The process of claim 1, wherein the anionic dye belongs to the class of the monoazo, disazo, polyazo, metal complex azo or disazo dyes or to the series of the anthraquinone dyes, copper, nickel or cobalt phthalocyanine dyes, copper formazan dyes, azomethine, nitroaryl, dioxazine, triphendioxazine, phenazine or stilbene dyes.

7. The process of claim 6, wherein the anionic dye is a reactive dye and one or more, reactive hooks of the dye are bonded covalently to the cationic polysaccharide.

8. The process of claim 1, wherein the dyesalt formulation is added in an amount of 1 to 20, % by weight, based on the cellulose content of the spinning dope prior to coagulation and shaping.

9. Colored regenerated-cellulose fiber prepared by the process of claim 1.

10. The process of claim 4, wherein x of said formula —$(CHR^1)_x$—$^{\oplus}NR^2R^3R^4$, is a number from 2 to 3.

11. The process of claim 7, wherein 1 to 2 reactive hooks of the dye are bonded covalently to the cationic polysaccharide.

12. The process of claim 8, wherein said dyesalt formulation is added in an amount of 1 to 12% by weight, based on the cellulose content of the viscose dope, alkali cellulose or cellulose solution prior to coagulation and shaping.

* * * * *

UNITED STATES PATENT AND TRADEMARK OFFICE
CERTIFICATE OF CORRECTION

PATENT NO. : 5,851,239
DATED : December 22, 1998
INVENTOR(S) : Andrea Von Der Eltz et al.

It is certified that error appears in the above-identified patent and that said Letters Patent is hereby corrected as shown below:

Claim 1, line 2 (column 7, line 47/48), change "drysalt" to --dyesalt--.

Claim 7, line 2 (column 8, line 33/34), delete ",".

Signed and Sealed this

Eighteenth Day of May, 1999

Attest:

Q. TODD DICKINSON

*Attesting Officer*  Acting Commissioner of Patents and Trademarks